United States Patent
Sluszniak et al.

(10) Patent No.: US 12,442,529 B2
(45) Date of Patent: Oct. 14, 2025

(54) CIRCULATING FLUIDIZED BED BOILER

(71) Applicant: SUMITOMO SHI FW ENERGIA OY, Espoo (FI)

(72) Inventors: Slawomir Sluszniak, Gliwice (PL); Roger Glowicki, Oswitecim (PL); Krzysztof Wyka, Nieborowice (PL); Slawomir Solipiwko, Czekanka (PL); Bartlomiej Ferdyn, Piekary Slaskie (PL)

(73) Assignee: Sumitomo SHI FW Energia Oy, Espoo (FI)

( * ) Notice: Subject to any disclaimer, the term of this patent is extended or adjusted under 35 U.S.C. 154(b) by 338 days.

(21) Appl. No.: 18/252,068

(22) PCT Filed: Dec. 7, 2021

(86) PCT No.: PCT/EP2021/084499
§ 371 (c)(1),
(2) Date: May 8, 2023

(87) PCT Pub. No.: WO2022/122694
PCT Pub. Date: Jun. 16, 2022

(65) Prior Publication Data
US 2023/0400179 A1    Dec. 14, 2023

(30) Foreign Application Priority Data

Dec. 9, 2020 (FI) .................................. 20206271

(51) Int. Cl.
*F23C 10/10* (2006.01)
*F22B 1/00* (2006.01)

(52) U.S. Cl.
CPC .................................. *F23C 10/10* (2013.01)

(58) Field of Classification Search
CPC .......... F23C 10/04; F23C 10/08; F23C 10/10; F22B 31/0069; F22B 31/0084; F22B 31/0092; F23J 11/00
See application file for complete search history.

(56) References Cited

U.S. PATENT DOCUMENTS 4,419,940 A    12/1983    Cosar et al.
4,686,939 A     8/1987    Strömberg
(Continued)

FOREIGN PATENT DOCUMENTS

AT           1397 U1      4/1997
CN        1219666 A       6/1999
(Continued)

OTHER PUBLICATIONS

International Search Report and Written Opinion of the ISA issued in International Application No. PCT/EP2021/084499, dated Mar. 28, 2022 (11 pages).
(Continued)

*Primary Examiner* — Steven S Anderson, II
(74) *Attorney, Agent, or Firm* — Venable LLP

(57) ABSTRACT

A circulating fluidized bed boiler includes a vertically extending furnace, a separator unit, and an exhaust gas channel connected to the separator unit via a cross over duct. The exhaust gas channel includes a first vertically extending pass, a horizontally extending pass, and a second vertically extending pass. The first vertically extending pass, the horizontally extending pass, and the second vertically extending pass are arranged successively in the gas flow direction such that the horizontally extending pass is configured to connect the first vertically extending pass and the second vertically extending pass with each other. The horizontally extending pass is arranged below the separator unit, (Continued)

which is arranged between the first vertically extending pass and the second vertically extending pass.

16 Claims, 4 Drawing Sheets

(56) References Cited

U.S. PATENT DOCUMENTS

| | | | | |
|---|---|---|---|---|
| 2002/0017100 | A1* | 2/2002 | Berndt | F01K 7/24 |
| | | | | 60/653 |
| 2016/0201898 | A1* | 7/2016 | Li | F23C 6/045 |
| | | | | 431/5 |
| 2018/0195714 | A1* | 7/2018 | Liu | F23J 15/022 |

FOREIGN PATENT DOCUMENTS

| | | |
|---|---|---|
| CN | 2711537 Y | 7/2005 |
| CN | 102215949 A | 10/2011 |
| CN | 203147746 U | 8/2013 |
| CN | 103 423 738 A | 12/2013 |
| CN | 203 431 878 U | 2/2014 |
| CN | 203 478 218 U | 3/2014 |
| CN | 206989184 U | 2/2018 |
| JP | S63-143409 A | 6/1988 |
| JP | H6-46115 U | 6/1994 |
| JP | H6-65701 U | 9/1994 |
| JP | 2001-235101 A | 8/2001 |
| JP | 2011-127818 A | 6/2011 |
| KR | 10-1354938 B1 | 1/2014 |
| WO | 1996/038689 A1 | 12/1996 |
| WO | 2007/035169 A1 | 3/2007 |
| WO | 2010/116039 A1 | 10/2010 |

OTHER PUBLICATIONS

International Preliminary Report on Patentability issued on Jun. 22, 2023, in International Patent Application No. PCT/EP2021/084499 (8 pages).
Finnish Office Action and Search Report issued on Jun. 21, 2021, in Finnish Patent Application No. 20206271 (5 pages).
Japanese Office Action issued Jul. 16, 2024, in corresponding Japanese Patent Application No. 2023-525963 (8 pages).
Chinese Office Action issued May 23, 2025, in corresponding Chinese Application No. 202180081144.2, with English translation (12 pages).

* cited by examiner

CIRCULATING FLUIDIZED BED BOILER

TECHNICAL FIELD

The present invention relates to a circulating fluidized bed boiler

BACKGROUND ART

The present invention relates to a circulating fluidized bed reactor having a vertical combustion chamber and a convection part that at least partly are formed by tube walls, and a vertical cyclone separator, the gas inlet channel of which is connected to the upper part of the combustion chamber and a return path for separated solids is connected to the lower part of the combustion chamber. Fluidized bed boilers, and, particularly, circulating fluidized bed boilers are known to be advantageous for combustion of great variety of solid fuels, such as fuels derived from various waste material while being configured to produce steam.

Document WO2007035169A1 discloses a furnace for combusting solid refuse in a fluidized bed. The flue gases pass from the furnace into a withdrawal chute, which constitutes the input to a return flue, and where from the gases pass onwards through a rear chute out of the boiler. The flue gases subsequently pass through gas cleaning equipment, which comprises a cyclone and a filter, before they are allowed to escape through a chimney to the air.

U.S. Pat. No. 4,686,939 discloses a fluidized bed boiler comprising a primary particle trap and a pass containing convective heat exchangers. The particle trap is located at the transition between the top of the reactor and a first vertically extending pass. The first vertically extending pass is an empty pass that does not include any inserted heat exchangers. Instead the boiler comprises an upward pass after the first vertically extending pass where a convective heat exchanger is located. There is a cyclone arranged to follow the upward pass.

CN203431878U discloses a circulating fluidized bed boiler system using municipal solid waste as a single fuel. The boiler system includes a combustion chamber and a cyclone separator connected to the combustion chamber. A vertical heat exchange flue for the exhaust gas is connected to the cyclone separator and a horizontal heat exchange flue provided with superheaters and economizers.

KR101354938 discloses a fluidized bed combustion boiler for RDF fuel. The boiler has cyclone separator connected through a flue gas path to an empty pass and a convective heat transfer pass. The heat transfer pass comprises a superheater, an economizer, and an air preheater.

All of the above-mentioned publications disclose an in-line layout of the plant. This results in a considerably long, and cumbersome arrangement, since the different parts of the boiler are located laterally one after the other in the course of exhaust gas flow.

An object of the invention is to provide a circulating fluidized bed boiler that enhances the compactness of the boiler considerably compared to the prior art solutions.

DISCLOSURE OF THE INVENTION

Objects of the invention can be met substantially as is disclosed in the independent claim and in the other claims describing more details of different embodiments of the invention.

According to an embodiment of the invention, a circulating fluidized bed boiler comprises a vertically extending furnace, a separator unit and a cross over duct, and an exhaust gas channel connected to the separator unit via the cross over duct. The exhaust gas channel comprises a first vertically extending pass and a horizontally extending pass and a second vertically extending pass, wherein the first vertically extending pass and the horizontally extending pass and the second vertically extending pass are arranged successively in the gas flow direction, when in use, such that the horizontally extending pass is configured to connect the first vertically extending pass and the second vertically extending pass with each other, and the horizontally extending pass is arranged below the separator unit, which is arranged between the first vertically extending pass and the second vertically extending pass.

This way, the need of particular floor space of the circulating fluidized bed boiler is minimized and/or utilized very efficiently.

According to an embodiment of the invention, the furnace has a rectangular cross section and the horizontally extending pass extends parallel with a rear wall of the furnace.

According to an embodiment of the invention, the furnace has a rectangular cross section and the horizontally extending pass extends parallel with a rear wall of the furnace and the cross over duct extends parallel with the rear wall of the furnace.

The rectangular shape of the cross section of the furnace together with the horizontally extending pass and the cross over duct directed parallel with the rear wall of the furnace decreases the required footprint of the boiler.

According to an embodiment of the invention, a solids return system is arranged at least partly between the first vertically extending pass and the second vertically extending pass.

When the solids return system is fitted between the vertically extending exhaust gas passes, the occupied volume of the circulating fluidized bed boiler is not increased by the solids return system, but is mainly defined by the furnace, cross over duct, and the vertical gas passes.

According to an embodiment of the invention, the circulating fluidized bed boiler is provided with a fluidized bed solid material cooler in the solids return system providing a path of a return channel of separated solids, which fluidized bed solid material cooler is at least partially arranged between the first vertically extending pass and the second vertically extending pass.

Even if, in addition to a solids return channel, a fluidized bed solid material cooler or the solids return system is fitted between the vertically extending exhaust gas passes, the occupied volume of the circulating fluidized bed boiler is still mainly defined by the furnace, cross over duct, and the vertical gas passes.

According to an embodiment of the invention the furnace has a rectangular cross section and the horizontally extending pass extends parallel with a rear wall of the furnace, the cross over duct extends parallel with the rear wall of the furnace, and a solids return system is arranged between the first vertically extending pass and the second vertically extending pass.

According to an embodiment of the invention, the furnace has a rectangular cross section and the horizontally extending pass extends parallel with a rear wall of the furnace, the cross over duct extends parallel with the rear wall of the furnace, a solids return system is arranged between the first vertically extending pass and the second vertically extending pass, and the circulating fluidized bed boiler is provided with a fluidized bed solid material cooler in the path of a return channel of separated solids, which fluidized bed solid material cooler is at least partially arranged between the first vertically extending pass and the second vertically extending pass.

According to an embodiment of the invention, the first vertically extending pass has a first end connected to an outlet of cross over duct, and a second end, and the second vertically extending pass has a first end and a second end, and the horizontally extending pass between the first and the second vertically extending pass is connected to the second end of the first vertically extending pass and the first end of the second vertically extending pass.

According to an embodiment of the invention, the first vertically extending pass has a first end connected to an outlet of cross over duct, and a second end, and the second vertically extending pass has a first end and a second end, and the horizontally extending pass between the first and the second vertically extending pass is connected to the second end of the first vertically extending pass and the first end of the second vertically extending pass, and the first vertically extending pass and the second vertically extending pass are at a right angle to with the horizontally extending pass.

According to an embodiment of the invention, the first vertically extending pass is free from heat exchangers in its internal space. This provides an effect that the exhaust gases are cooled only by heat transfer to the walls of the first vertically extending pass from which any deposit may be easily removed by suitable rapping systems, compared to cleaning of internal heat exchanger bundles. This embodiment is feasible in connection with any other embodiment of the invention since the first vertically extending pass is an integral part of the invention.

According to an embodiment of the invention, there are heat exchangers arranged to transfer heat from the exhaust gas in the exhaust gas channel as follows: in the first vertically extending pass is an empty pass free from heat exchangers in its internal space, the horizontally extending pass comprises at least one heat exchanger in its internal space and the second vertically extending pass comprises at least one heat exchanger in its internal space.

According to an embodiment of the invention, a steam generation system is arranged in connection with the circulating fluidized bed boiler, comprising economizer heat exchangers, evaporating heat exchangers, and superheater heat exchangers, wherein the superheater heat exchangers are arranged in connection with the fluidized bed solid material cooler and the cross over duct, the evaporating heat exchangers are arranged in connection with the furnace, the separator unit and the horizontally extending pass and the economizer heat exchangers are arranged in connection with the second vertically extending pass, and the first vertically extending pass is free from heat exchangers in its internal space.

According to another embodiment of the invention, a steam generation system is arranged in connection with the circulating fluidized bed boiler, comprising economizer heat exchangers, evaporating heat exchangers, and superheater heat exchangers, wherein the superheater heat exchangers are arranged in connection with the fluidized bed solid material cooler and the cross over duct, the evaporating heat exchangers are arranged in connection with the furnace, the separator unit, the horizontally extending pass and the second vertically extending pass, and the economizer heat exchangers are arranged in connection with the second vertically extending pass, and the first vertically extending pass is free from heat exchangers in its internal space.

Generally, an advantage of the design is that the gas passes are close to the furnace and the solid material fluidized bed cooler. This way, since there is a functionally empty gas pass involved, the overall design reduces the required room of the boiler and the length of steam piping. The layout provides also advantages in terms on connecting different steam generating stages in the steam system.

According to an embodiment of the invention, the horizontally extending pass comprises independently supported modules each comprising an evaporating heat exchanger, which facilitates the service of the heat exchangers in the horizontally extending gas pass.

According to an embodiment of the invention, the horizontally extending pass comprises independently supported modules each comprising a heat exchanger, which facilitates the service of the heat exchangers in the horizontally extending gas pass.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features that are considered as characteristic of the invention are set forth in particular in the appended claims.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
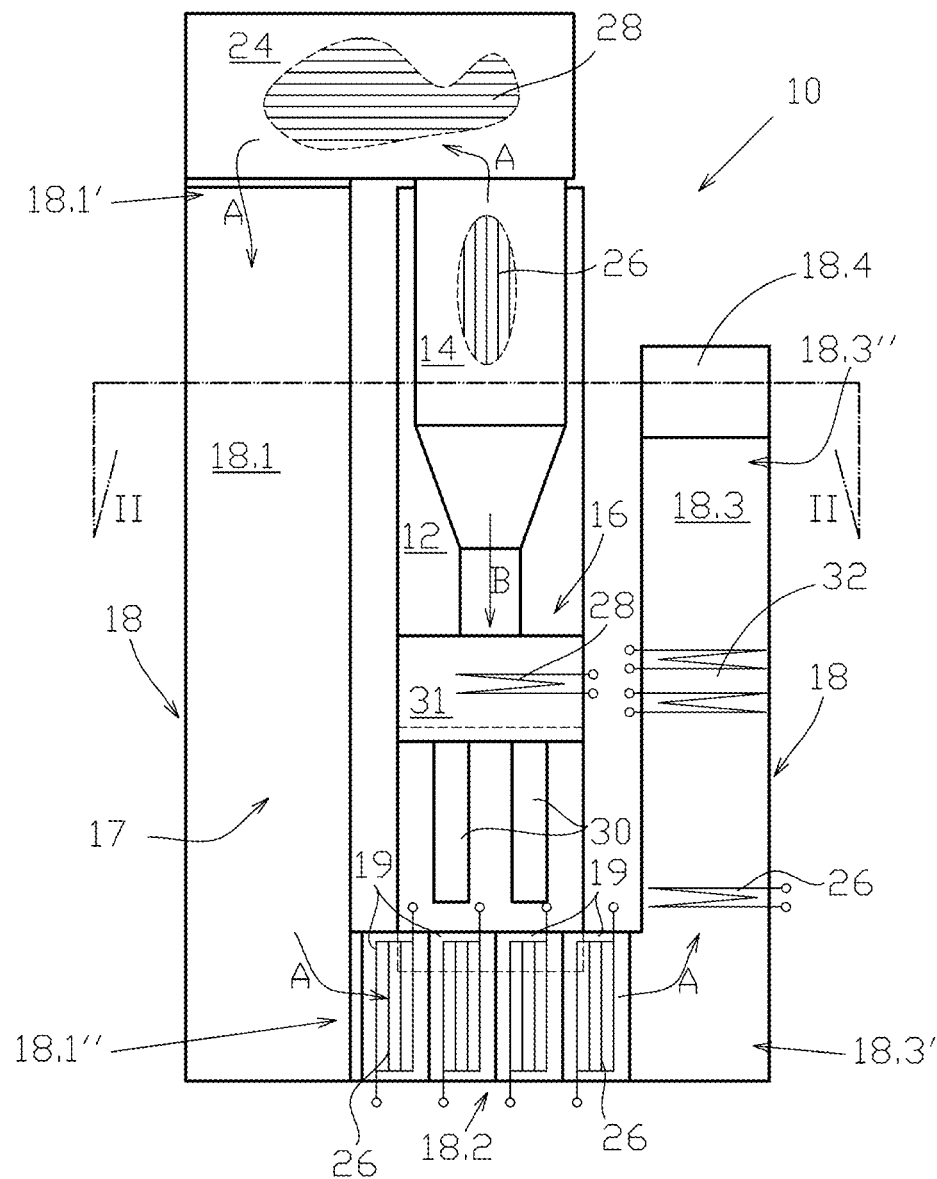
FIG. 1 illustrates a circulating fluidized bed boiler according to an embodiment of the invention.

FIG. 1 depicts schematically a circulating fluidized bed (CFB) boiler 10 according to an embodiment of the invention. The circulating fluidized bed boiler 10 comprises a furnace 12, a solids separator 14, which may generally be referred to as a separator unit, and solids return system 16, as well as a cross over duct 24 that connects the separator unit 14 with an exhaust gas channel 18. The cross over duct 24 and the exhaust channel 18 are configured to lead the exhaust gases generated by combustion of fuel in the CFB boiler to further processing and eventually to the atmosphere, in a most usual case. The circulating fluidized bed (CFB) boiler 10 is supported by a separate support structure that is not shown here for clarity reasons. In practical cases, a relatively large boiler is arranged top-supported, i.e., it is supported so that the boiler is arranged to hang from a conventional rigid support steel structure extending around and above the boiler pressure body. Relatively small boilers may be arranged bottom-supported, wherein a vertical load of the boiler is supported solely by a rigid support steel structure arranged below the boiler. The main difference between top-supported and the bottom-supported constructions is that, when the temperature of the boiler increases, thermal expansion of a top-supported boiler takes place mainly downwards whereas in a bottom-supported boiler thermal expansion takes place mainly upwards. A third alternative of supporting the boiler 10 in practice is to support it to a rigid support steel structure at its middle section. Thereby, the lower portion of the boiler, below the middle section, is top-supported, and the upper portion of the boiler pressure body, above the middle section, is bottom supported. Middle-supported construction is advantageous in that while it reduces the size of the support steel structure from that needed for the top-supported boiler. Simultaneously, such a middle-supported construction decreases the need for very strong walls of the boiler as is the case in bottom-supported boilers.

Figure 2:
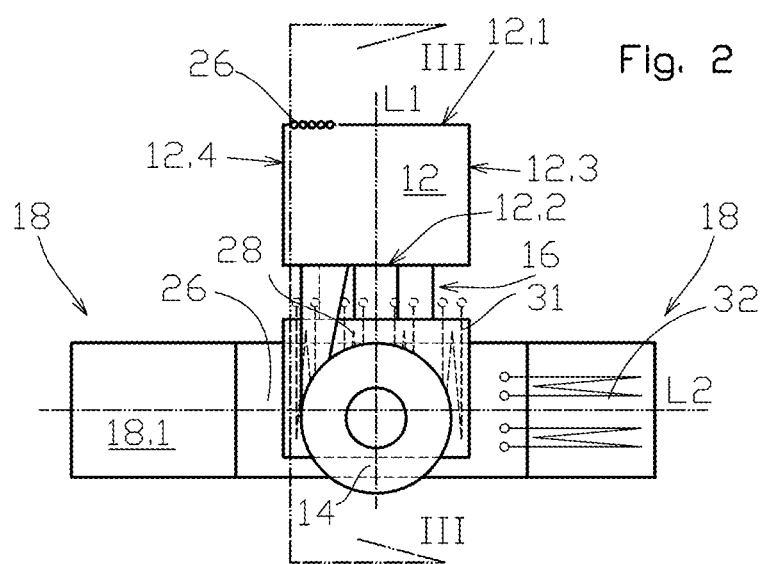
FIG. 2 illustrates a sectional view II-II of the FIG. 1.
Figure 3:
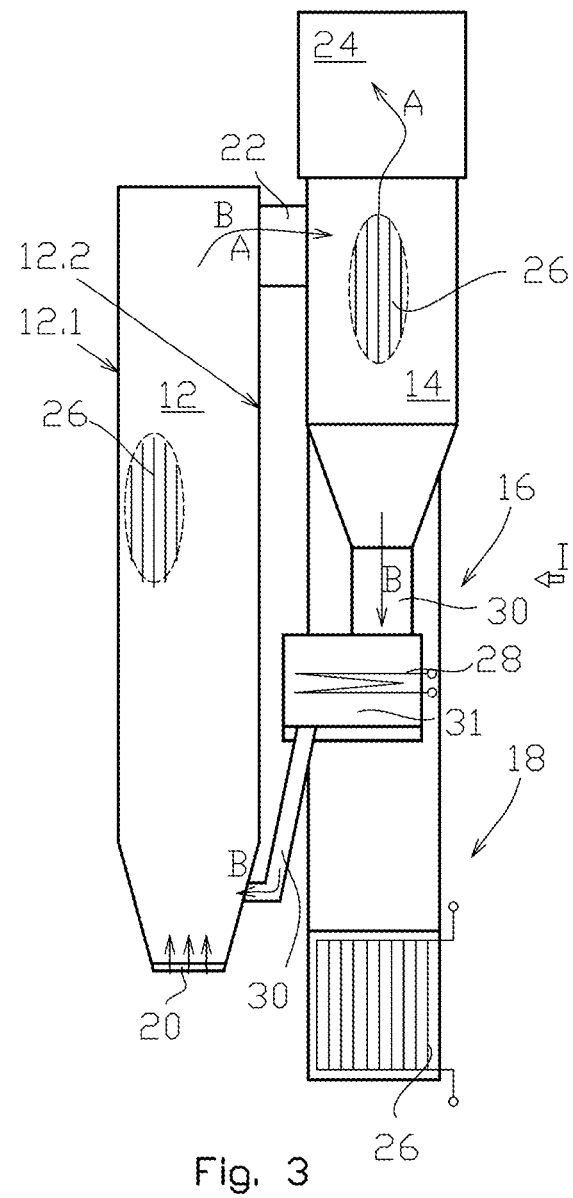
FIG. 3 illustrates a sectional view III-III of the FIG. 2.

In the following the circulating fluidized bed boiler 10 is explained with reference to the FIGS. 1 to 3. FIG. 1 shows the circulating fluidized bed boiler 10 from a side where the solids separator 14 is assembled, which is called here a back side of the circulating fluidized bed boiler 10, the direction of which is indicated in the FIG. 3 by the arrow I. FIG. 2 shows a sectional view II-II of FIG. 1 and FIG. 3 shows a sectional view III-III of the FIG. 2. The furnace 12 of the CFB 10 is extending vertically and it has advantageously a rectangular cross section with tapering lower section thereof. There is a windbox 20 at the lower end of the furnace 12 for introducing fluidization gas into the furnace 10 through a grid. The cross section of the furnace 12 shown in the figure is of a rectangular shape and it has a front wall 12.1, a rear wall 12.2, a left wall 12.3 and a right wall 12.4. The furnace 12 is connected to the solids separator 14 at its upper region by a flow channel 22 coupled to the rear wall 12.2 of the furnace 12. The solids separator 14 advantageously consists of one cyclone separator having its central pipe as a gas outlet. In some practical applications, the separator unit may be provided with more than one parallel cyclone separators instead of one or with other type of separator, such as an impingement separator. The separator is cooled comprising evaporating heat exchangers or surfaces 26 integrated to its walls, as is customary in the art. Advantageously, the evaporating heat exchangers are coupled such that natural circulation of evaporating water based solution is obtained. In operation of the CFB 10, a major part of solid materials entrained by the gases flowing from the furnace to the separator 14 is separated from the gas flow. At least part—usually a major portion—of separated solid material, herein referred to as solids, is returned back to furnace 12 via the solids return system 16.

The exhaust gas channel 18 of the circulating fluidized bed boiler 10 is connected to the separator unit 14 through a substantially horizontally extending cross over duct 24. The cross over duct 24 is arranged to connect the solids separator 14, at its gas outlet, and the first vertically extending pass 18.1 at above the aforementioned parts. The walls of the cross over duct 24 are cooled, preferably, steam cooled. So, the cross over duct 24 comprises cooled walls that are arranged as heat exchangers surfaces 28 and the internal gas space of the cross over duct 24 is empty, i.e., free from internal heat exchangers.

The exhaust gas channel 18 comprises a first vertically extending pass 18.1 to which the cross over duct is connected. The exhaust gas channel 18 further comprises a horizontally extending pass 18.2 and a second vertically extending pass 18.3. One end of the horizontally extending pass 18.2 is arranged in connection with a lower portion of the first vertically extending pass 18.1. Another end of the horizontally extending pass 18.2 is arranged in connection with a lower portion of the second vertically extending pass 18.3. The general flow direction of the gas in the circulating fluidized bed boiler is depicted by the arrows A in the figures, and the general flow direction of the separated solid is shown by the arrows B. The horizontally extending pass 18.2 has a length that is at least equal to the width of the rear wall 12.2 of the furnace 12 such that the first and the second vertically extending passes leave a space for the fluidized bed heat exchanger 31.

The first vertically extending pass 18.1 has a first end 18.1' connected to an outlet of the cross over duct 24 and a second end 18.1" that is at an opposite end part to the first end 18.1'. The gas flow opening in the first end 18.1' of the first vertically extending pass 18.1 is at its top, the circumference of the opening formed by the ends of the side walls of the first vertically extending pass 18.1. The gas flow opening in the second end 18.1" of the first vertically extending pass 18.1 is arranged to one of its side walls, such that the very end of the pass is closed by a wall. The second vertically extending pass 18.3 has a first end 18.3' and a second end 18.3". The horizontally extending pass 18.2 between the first and the second vertically extending passes is connected to the second end 18.1" of the first vertically extending pass 18.1 and the first end 18.3' of the second vertically extending pass 18.3. There is a gas outlet 18.4 at the second end of the of the second vertically extending pass 18.3. Advantageously, there is a rigid connection between the furnace 16, the separator unit 14, the solids return system 16, and the cross over duct, and an expansion joint between the cross over duct 24 and first vertically extending pass 18.1 and the first vertically extending pass 18.1 and the horizontally extending pass 18.2. The first vertically extending pass 18.1 and the second vertically extending pass 18.3 are parallel with each other and at a right angle with the horizontally extending pass 18.2. Each one of the passes forms a straight conduit for the exhaust gas. The cross over duct is supported on the separator unit roof, which means that it does not need any additional support from steel structure.

As it becomes clear from FIGS. 1 to 3, the exhaust gas channel 18 is configured such that the cross over duct 24, the first vertically extending pass 18.1 and the horizontally extending pass 18.2, as well as the second vertically extending pass 18.3, are arranged successively in the gas flow direction A such that the cross over duct 24 connects the separator unit 14 to the first vertically extending pass 18.1, and the horizontally extending pass 18.2 is configured to connect the first vertically extending pass 18.1 and the second vertically extending pass 18.3 with each other. In other words, the gas is arranged to flow from the cross over duct 24 to the first vertically extending pass 18.1, where, when the fluidized bed boiler is in use, the flue gas flows substantially downwards. The flue gas flows further from the first vertically extending pass 18.1 to the horizontally extending pass 18.2, where the flue gas flows substantially horizontally. The flue gas flows still further from the horizontally extending pass 18.2 to the second vertically extending pass 18.3 where the flue gas flows substantially upwards. The cross over duct 24 is also extending horizontally and there the flue gas flows substantially horizontally, but substantially opposite direction to the gas flow direction in the horizontally extending pass 18.2.

The separator unit 14 is situated at least partly between the first vertically extending pass 18.1 and the second vertically extending pass 18.3 and above the horizontally extending pass 18.2. This becomes clear particularly from FIG. 2. The inner space of the furnace 12 and the separator unit 14 are arranged adjacently to each other. There is a line L1 running through the cross sections of the furnace 12 and the separator unit 14, and a line L2 running through the cross sections of the first vertical pass 18.1 and the second vertical pass 18.2.

More particularly, in FIG. 2, the line L1 is running through the centres of the cross sections of the furnace 12 and the separator unit 14, and the line L2 running through the centers of the cross sections of the first vertical pass 18.1 and the second vertical pass 18.2. And, as can be seen, the lines L1 and L2 are at an angle to each other. In the embodiments of the figures, the position of the separator unit 14 in respect to the furnace, and the vertical passes is such that there is a right angle between the lines L1 and L2, but if, for example, the separator unit 14 would be, for some practical reason, moved towards either of the vertical passes from its current position, the angle would still be substantially a right angle. This means also that the horizontally extending pass 18.2 is extending parallel with both the rear wall 12.2 and the front wall 12.1 of the furnace 12, since the furnace 12 has a rectangular cross section. In practice, it is worth noting that the direction of the cross over duct 24 is parallel with the direction of the horizontally extending pass 18.2. And, as can be seen particularly in FIGS. 2 and 3, the separator unit 14 is not only at vertically higher level to the horizontally extending pass 18.2 but also directly above the horizontally extending pass 18.2, i.e., it is laterally at the same position.

The solids return system 16 comprises a return channel 30 of separated solids, and is arranged between the first vertically extending pass 18.1 and the second vertically extending pass 18.3. There is a fluidized bed solid material cooler 31 in the path of a return channel of separated solids. The fluidized bed solid material cooler 31 is provided with one or more heat exchangers, according to the invention, for superheating steam, and, therefore, it can be referred to as a fluidized bed heat exchanger, as well. Also, the fluidized bed solid material cooler 31 is at least mainly arranged between the first vertically extending pass 18.1 and the second vertically extending pass 18.3, below the separator unit 14. Even if not shown in the figures the solids return system 16 is provided with a loop seal arrangement for preventing back flow of gas from the furnace 16 to the separator unit 14.

The circulating fluidized bed boiler according to the invention is particularly advantageous for combustion of solid waste derived fuel, such as biomass, sludges, and refuse derived fuels having various compositions. The heat produced by combustion is utilized in steam generation. The compact design provided by the invention is particularly advantageous for CFB boiler for waste derived fuel. The circulating fluidized bed boiler may be a part of a power plant producing electric power. Typically, the working medium is a water based solution. The CFB boiler 10 comprises a steam generation system, connected to a steam cycle applying, for example, approximately the rankine cycle. The steam generation system is arranged in connection with the circulating fluidized bed boiler such that it comprises economizer heat exchangers 32, evaporating heat exchangers 26 and superheater heat exchangers 28. The superheater heat exchangers 28 of the steam generation system are located in the fluidized bed solid material cooler 31 and in the cross over duct 24, the evaporating heat exchangers 26 are located in the furnace 16 (cooled furnace wall), the separator unit 14, in the horizontally extending pass 18.2, and partly also in the second vertically extending pass 18.3. The economizer heat exchangers 32 are located in the second vertically extending pass 18.3. The first vertically extending pass 18.1 is free from heat exchanger bundles in its internal space 17, and, therefore, the first vertically extending pass 18.1 can be called in practice as an empty pass. The flue gas is cooled by the cooled wall of the first vertically extending pass 18.1 so as to avoid or at least mitigate chlorine and heavy metal corrosion.

All of the main parts of the CFB boiler 10 are substantially provided with a heat insulation cover. Thanks to the layout of the CFB boiler 10, according to the invention, the economizer heat exchangers 32, the evaporating heat exchangers 26, and the superheater heat exchangers 28 are adjacently located with each other and the length of the necessary piping is therefore minimized, which also minimizes the need of insulation of the piping. In order to further ease the maintenance of the CFB boiler 10, the horizontally extending pass 18.2 comprises independently supported, assemblable and disassemblable heat exchanger modules 19, each one of which is provided with an evaporating heat exchanger 26. In the embodiment of the figures, the horizontally extending pass 18.2 consists of four heat exchanger modules 19, in which the number of the modules is selected as required by the practical application. The modules are configured to be removable in a horizontal direction from the gas pass. The second vertically extending pass 18.3 is supported independently from the bottom. Both of the vertically extending passes and the horizontally extending pass are equipped with a proper amount of ash hoppers that can be designed as cooled or uncooled parts.

Figure 4:
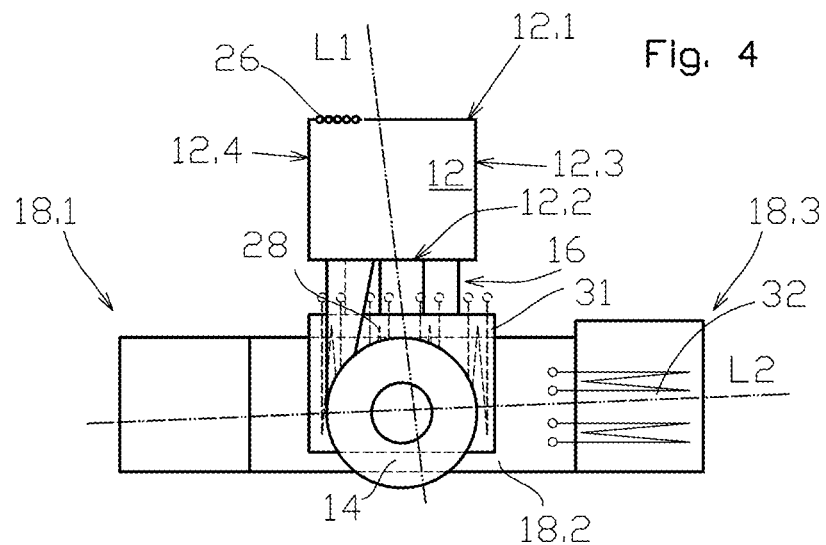
FIG. 4 illustrates a sectional view II-II of the FIG. 1 according to another embodiment of the invention.

FIG. 4 shows a sectional view II-II according to another embodiment of the invention, which illustrates some possibilities to make adaptations to the boiler system 10 according to an embodiment of the invention. There is a line L1 running through the cross sections of the furnace 12 and the separator unit 14, and a line L2 running through the cross sections of the first vertically extending pass 18.1 and the second vertically extending pass 18.3. In this embodiment, the second vertically extending pass 18.3 has a greater cross sectional area compared to that shown in the FIG. 2, having the channel cross section extended towards the furnace 12 from a general wall line of the horizontally extending pass 18.2. Also, the empty pass 18.1 has a smaller cross sectional area than that in FIG. 2. And, as can be seen, the lines L1 and L2 are also now at an angle to each other. In the boiler 10, according to the invention, the furnace and the separator unit 14 are adjacent to each other in a first direction, which is generally in the direction of the line L1. The first and the second vertically extending pass and the horizontally extending pass 18.2 are arranged substantially in a vertical plane adjacently to each other in a second direction that is generally the direction of the rear wall 12.2 of the furnace 12. The cross-sectional areas of the first and the second vertically extending passes 18.1, 18.3 are designed suitably according to the need of a specific practical application. It is conceivable that, in some cases, the cross sectional are of the empty pass 18.1 is greater than that of the second vertically extending pass 18.2, but if the circumstances so requires the case may be vice-versa. The criteria may be a desired gas velocity or pressure drop.

Figure 5:
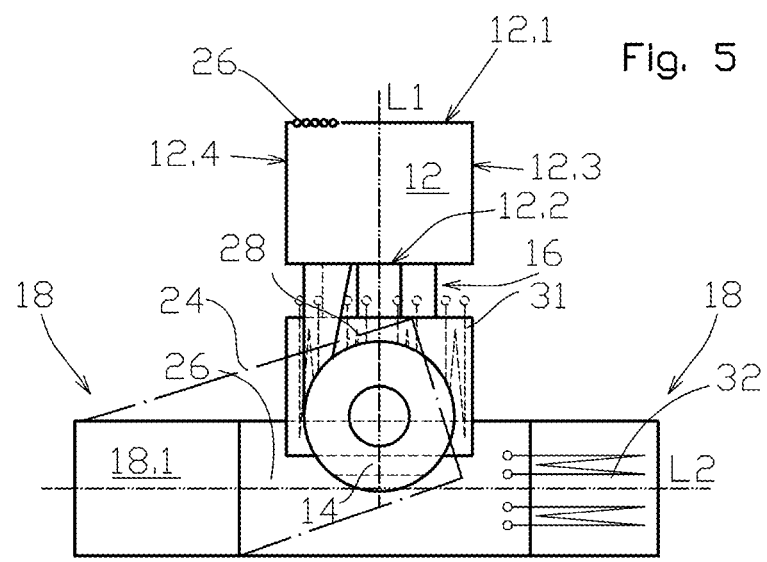
FIG. 5 illustrates a sectional view II-II of the FIG. 1 according to another embodiment of the invention.

FIG. 5 depicts an embodiment of the invention by means of which benefits of the invention can be obtained in respect to at least the space saving of the exhaust gas channel 18, while some more room is reserved between the exhaust gas channel 18 and the furnace 12. The embodiment of FIG. 5 differs from the one in the FIG. 2 such that the cross over duct 24 is at an angle to, i.e., non-parallel with the longitudinal direction of the horizontally extending pass 18.2. This way, the horizontal distance between the exhaust gas channel 18 and the furnace 12 is increased, compared to that shown in FIG. 1. It should be noted that the features shown in FIGS. 2, 4, and 5 are technically compatible with each other to freely combine them with each other. Particularly, the feature shown in FIG. 5, providing more horizontal distance between the exhaust gas channel 18 and the furnace 12, makes it possible to apply the increased cross section of the exhaust gas channel shown in the FIG. 4. This is not shown in FIG. 5, because this feature also allows using the space for other purposes, as well.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A circulating fluidized bed boiler comprising:
   a vertically extending furnace;
   a separator unit;
   a cross over duct; and
   an exhaust gas channel connected to the separator unit via the cross over duct, the exhaust gas channel comprising a first vertically extending pass and a horizontally extending pass and a second vertically extending pass, wherein the first vertically extending pass and the horizontally extending pass and the second vertically extending pass are arranged successively in the gas flow direction such that the horizontally extending pass is configured to connect the first vertically extending pass and the second vertically extending pass with each other, and wherein the horizontally extending pass is arranged below the separator unit which is arranged between the first vertically extending pass and the second vertically extending pass.

2. A circulating fluidized bed boiler according to claim 1, wherein the horizontally extending pass comprises independently supported modules each comprising an evaporating heat exchanger.

3. A circulating fluidized bed boiler according to claim 1, wherein the furnace has a rectangular cross section and the horizontally extending pass extends parallel with a rear wall of the furnace.

4. A circulating fluidized bed boiler according to claim 3, wherein the cross over duct extends parallel with the rear wall of the furnace.

5. A circulating fluidized bed boiler according to claim 1, further comprising a solids return system arranged at least partly between the first vertically extending pass and the second vertically extending pass.

6. A circulating fluidized bed boiler according to claim 5, further comprising a fluidized bed solid material cooler in a solids return system, the fluidized bed solid material cooler being at least partially arranged between the first vertically extending pass and the second vertically extending pass.

7. A circulating fluidized bed boiler according to claim 1, wherein the first vertically extending pass has a first end connected to an outlet of the cross over duct, and a second end, and the second vertically extending pass has a first end and a second end.

8. A circulating fluidized bed boiler according to claim 7, wherein the horizontally extending pass between the first and the second vertically extending pass is connected to the second end of the first vertically extending pass and the first end of the second vertically extending pass.

9. A circulating fluidized bed boiler according to claim 7, wherein the first vertically extending pass and the second vertically extending pass are at right angles to the horizontally extending pass.

10. A circulating fluidized bed boiler according claim 9, wherein the first vertically extending pass is free from heat exchangers in its internal space.

11. A circulating fluidized bed boiler according to claim 1, further comprising a steam generation system arranged in connection with the circulating fluidized bed boiler.

12. A circulating fluidized bed boiler according to claim 11, the steam generation system comprising economizer heat exchangers, evaporating heat exchangers, and superheater heat exchangers.

13. A circulating fluidized bed boiler according to claim 12, wherein the superheater heat exchangers are arranged in connection with the fluidized bed solid material cooler and the cross over duct.

14. A circulating fluidized bed boiler according to claim 13, the evaporating heat exchangers are arranged in connection with the furnace.

15. A circulating fluidized bed boiler according to claim 14, wherein the separator unit, the horizontally extending pass, and the economizer heat exchangers are arranged in connection with the second vertically extending pass.

16. A circulating fluidized bed boiler according to claim 15, wherein the first vertically extending pass is free from heat exchangers in its internal space.

* * * * *